United States Patent
Klausberger et al.

(10) Patent No.: US 7,424,023 B2
(45) Date of Patent: Sep. 9, 2008

(54) METHOD AND ACCESS MULTIPLEXER FOR QUICK ACCESS TO DATA NETWORKS

(75) Inventors: Walter Klausberger, Wolfpassing (AT); Hartmut Schüler, Strasslach (DE)

(73) Assignee: Siemens Aktiengesellschaft, Munich (DE)

( * ) Notice: Subject to any disclaimer, the term of this patent is extended or adjusted under 35 U.S.C. 154(b) by 592 days.

(21) Appl. No.: 10/518,101

(22) PCT Filed: Jun. 3, 2003

(86) PCT No.: PCT/EP03/05806

§ 371 (c)(1),
(2), (4) Date: Dec. 9, 2004

(87) PCT Pub. No.: WO03/105522

PCT Pub. Date: Dec. 18, 2003

(65) Prior Publication Data

US 2005/0220120 A1      Oct. 6, 2005

(30) Foreign Application Priority Data

Jun. 11, 2002    (EP) .................................. 02012473

(51) Int. Cl.
*H04L 12/56* (2006.01)
(52) U.S. Cl. .................. 370/395.53; 370/401; 370/402; 713/153
(58) Field of Classification Search .................. 370/401, 370/356, 402, 395.53; 709/230; 726/2, 22; 713/153
See application file for complete search history.

(56) References Cited

U.S. PATENT DOCUMENTS

| 6,424,657 | B1 * | 7/2002 | Voit et al. ................... 370/412 |
| 6,778,542 | B1 * | 8/2004 | Hassan-Ali et al. ......... 370/401 |
| 7,039,049 | B1 * | 5/2006 | Akgun et al. ............... 370/389 |
| 2002/0021702 | A1 | 2/2002 | Park |

(Continued)

FOREIGN PATENT DOCUMENTS

WO    WO 01/06720 A1    1/2001

(Continued)

OTHER PUBLICATIONS

Gao Lu; Ma Yan; Liu Jianbing, "The design for Ethernet Access Concentrator," Info-tech and Info-net, 2001. Proceedings. ICII 2001—Beijing. 2001 International Conferences on , vol. 5, No., pp. 223-228 vol. 5, 2001.*

(Continued)

*Primary Examiner*—Hassan Kizou
*Assistant Examiner*—Jeffrey M Rutkowski
(74) *Attorney, Agent, or Firm*—Bell, Boyd & Lloyd LLP

(57) ABSTRACT

DSL methods, e.g. ADSL/SDSL, are increasingly used for quick access to the Internet. A data terminal of the subscriber is connected via a conventional copper twin wire to an access multiplexer by means of a modem. The access multiplexer is placed in an access node of the network provider, which provides the connection for the subscriber. Typically, the digital subscriber lines of a number of subscribers are connected via corresponding interface modules of the access multiplexer. The linking of the access multiplexer to downstream network elements is effected by means of an Ethernet network that is cost-effective with regard to both design and operation.

20 Claims, 1 Drawing Sheet

U.S. PATENT DOCUMENTS

| | | | |
|---|---|---|---|
| 2002/0147826 A1* | 10/2002 | Sultan | 709/230 |
| 2003/0195991 A1* | 10/2003 | Masel et al. | 709/251 |
| 2004/0213252 A1* | 10/2004 | Lee et al. | 370/395.1 |
| 2007/0005954 A1* | 1/2007 | Skemer | 713/153 |

FOREIGN PATENT DOCUMENTS

| | | | |
|---|---|---|---|
| WO | WO 01/78310 A2 | 10/2001 |
| WO | WO 02/19684 A2 | 3/2002 |
| WO | WO 02/41578 A2 | 5/2002 |

OTHER PUBLICATIONS

Toby Jessup, "DSL: The Corporate Connection", Data Communiations, McGraw Hill, vol. 27, No. 2, Feb. 1, 1998, New York, US, pp. 103-104, 106, 108, 110, XP000731801.

* cited by examiner

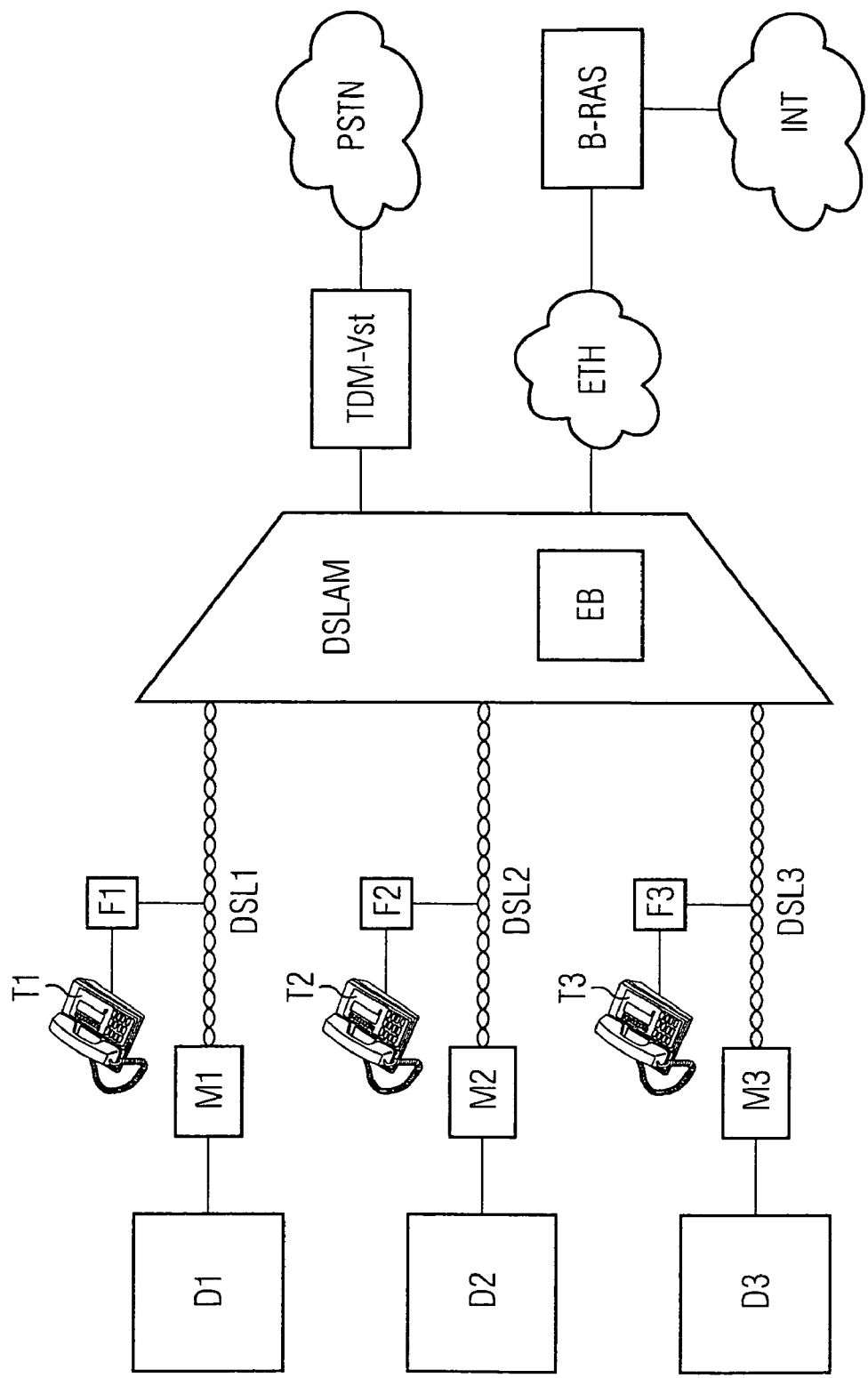

METHOD AND ACCESS MULTIPLEXER FOR QUICK ACCESS TO DATA NETWORKS

CROSS REFERENCE TO RELATED APPLICATIONS

This application is the US National Stage of International Application No. PCT/EP03/05806, filed Jun. 3, 2003 and claims the benefit thereof. The International Application claims the benefits of European application No. 02012473.1 filed Jun. 11, 2002, both applications are incorporated by reference herein in their entirety.

FIELD OF INVENTION

The invention relates to a method and an access multiplexer for quick access to data networks.

BACKGROUND OF INVENTION

DSL methods (DSL=digital subscriber line) and in particular asymmetric DSL methods (ADSL=asymmetric digital subscriber line) are increasingly used for quick access to the Internet. In this situation, ADSL differs from symmetric DSL methods (SDSL=symmetric digital subscriber line) essentially in that in the case of ADSL different transfer rates are provided for uplink (transfer from subscriber to the internet) and downlink (transfer from the internet to the subscriber). In this situation, the downlink transfer rate is regularly significantly (by a factor of 4 or 6, for example) higher than the uplink transfer rate since typically more data is transferred per unit of time over the downlink than over the uplink. In the case of SDSL, on the other hand, the transfer rates for downlink and uplink are the same.

In the following the term "DSL" is used as a generic term both for "ADSL" and also for "SDSL" since the actual transfer rates and the ratio of the transfer rates between uplink and downlink are of no relevance to the present invention.

A data terminal device of the subscriber, for example a PC (PC=personal computer) or a set-top box, is connected via a conventional copper twin wire to an access multiplexer (DSLAM) by means of an integrated or external modem to a DSLAM (DSLAM=DSL access multiplexer). The DSLAM is located in an access node of the network provider, which provides the connection for the subscriber. Typically, a plurality of subscribers is connected via corresponding interface modules of a DSLAM to the DSLAM.

In conventional DSL access networks, the DSLAM is linked to downstream network elements by means of an ATM network (ATM=asynchronous transfer mode).

The disadvantage in this situation is the fact that ATM networks are expensive and complicated both in their construction and in their operation since on the one hand the components of an ATM network (switches for example) are expensive in comparison with components which support other transfer technologies and on the other hand each connection in an ATM network needs to administered separately.

In order to avoid this disadvantage, "DSL: The Corporate Connection", T. Jessup, Data Communications Vol. 27, No. 2 (February 1998), pp. 103-108, McGraw Hill, New York, proposes for example that the DSL access lines be connected using ATM networks, Ethernets, T1 connections, serial lines or frame relays.

If the subscriber-side termination of the connection is implemented cost-effectively using Ethernet, there is however a danger that as a result of the self-configuration capabilities of the Ethernet bridge EB required in conjunction with the access multiplexer DSLAM an attack on the DSLAM using a large number of falsified MAC addresses (MAC=media access control) causes the routing tables of the DSLAM to overflow. In addition, in the case of unfiltered Ethernet traffic, unauthorized connections between the data terminal devices D1, D2, D3 are possible, for example.

SUMMARY OF INVENTION

The object of the present invention is therefore to specify a method and an access multiplexer for quick access to data networks, by means of which attacks on a DSLAM are prevented and unauthorized direct connections between data terminal devices connected to the DSLAM are prevented.

This object is achieved by the claims.

Preferred embodiments are set down in the dependent claims.

According to the present invention, a method for quick access to data networks INT is provided in which data terminal devices D1, D2, D3 of subscribers are each connected by means of a modem M1, M2, M3 respectively by way of a digital subscriber line DSL1, DSL2, DSL3 respectively to an access multiplexer DSLAM, whereby for the purposes of data transfer between the data terminal devices D1, D2, D3 and an access server B-RAS which is located downstream of the access multiplexer (DSLAM), which serves to check the access authorization of the data terminal devices D1, D2, D3 and establish the access to the data network (INT), the Point-to-Point Protocol over Ethernet PPPoE is used, according to which the link from the access multiplexer DSLAM to the access server B-RAS and to further components located downstream is implemented by means of an Ethernet network ETH. In this situation the access multiplexer has an Ethernet bridge (EB) which has filtering facilities for evaluating the PPPoE headers contained in received Ethernet frames, whereby:

Ethernet frames are routed to the Ethernet bridge (EB) if the PPPoE header can be assigned to an existing connection confirmed by the access server, or if the PPPoE header can be assigned to connection which is set up, and all other Ethernet frames which contain a PPPoE header are discarded, and all Ethernet frames which do not contain a PPPoE header are discarded.

In other words, all those Ethernet frames are discarded which can not be assigned to an existing PPPoE connection or to a PPPoE connection which is set up.

In accordance with the present invention, for quick access to data networks INT an access multiplexer DSLAM is additionally provided, to which data terminal devices D1, D2, D3 of subscribers are each connected by means of a modem M1, M2, M3 respectively by way of a digital subscriber line DSL1, DSL2, DSL3 respectively, whereby for the purposes of data transfer between the data terminal devices D1, D2, D3 and an access server B-RAS, which serves to check the access authorization of the data terminal devices D1, D2, D3 and establish the access to the data network (INT), the Point-to-Point Protocol over Ethernet PPPoE is used, whereby the access multiplexer DSLAM is connected to the access server (B-RAS) and to further components located downstream by means of an Ethernet network (ETH) and whereby the access multiplexer has the aforementioned Ethernet bridge and filtering facilities.

An important advantage of the method according to the invention and of the access multiplexer DSLAM according to the invention consists in the fact that it is considerably more cost-effective to set up an Ethernet network than to set up an ATM network since Ethernet components are simpler and thus cheaper to manufacture. Maintenance and operation of an Ethernet network are likewise significantly more cost-effective since an Ethernet network is self-configuring and the network administration required in the case of ATM networks is thus dispensed with. In this situation, the invention prevents attacks from being carried out on a DSLAM, using falsified MAC addresses for example, and prevents the possibility of unauthorized direct connections being set up between data terminal devices connected to the DSLAM.

If the subscriber-side termination of the connection is implemented cost-effectively using Ethernet, there is a danger that as a result of the self-configuration capabilities of the Ethernet bridge EB required in conjunction with the access multiplexer DSLAM an attack on the DSLAM using a large number of falsified MAC addresses (MAC=media access control) causes the routing tables of the DSLAM to overflow. In addition, in the case of unfiltered Ethernet traffic, unauthorized connections between the data terminal devices D1, D2, D3 are possible, for example. To the best advantage, all Ethernet frames which can not be assigned to an existing PPPoE connection or to a PPPoE connection which is set up are therefore discarded.

To the best advantage, when using the invention the conventional link between the data terminal devices of the subscribers and the access multiplexer is retained.

In one development of the method according to the invention and of the access multiplexer according to the invention, a combination with a method and/or with means offering overload protection is provided. The advantage of this combination consists in the fact that strong pulses or bursts of data traffic on the high bit rate Ethernet interface, which are to be routed to only one of the digital subscriber lines—which are low bit rate when compared with the Ethernet interface—, can not result in an overload situation there since Ethernet frames are necessarily already discarded from the receive buffer of the Ethernet interface. Ethernet frames which are used for connection control are advantageously excluded from the discard strategy.

The method according to the invention will be described in detail in the following as an embodiment with reference to a drawing.

BRIEF DESCRIPTION OF THE DRAWING

The single FIG. 1 shows a schematic view of the network structure for quick access to a data network using a digital subscriber line.

DETAILED DESCRIPTION OF INVENTION

FIG. 1 shows three data terminal devices D1, D2, D3 which are each connected by means of a modem M1, M2, M3 respectively by way of a digital subscriber line DSL1, DSL2, DSL3 respectively to an access multiplexer DSLAM. Typically, conventional (copper) telephone lines are used for quick access to the Internet INT using a digital subscriber line DSL, over which conventional analog or digital telephony services can be handled simultaneously. On the subscriber side this requires a splitter or filter F1, F2, F3 in each case for connecting each telephony terminal device T1, T2, T3. Although a coupling of the digital subscriber line DSL with conventional telephony services is normal, the present invention can also be used for DSL methods which do not provide this coupling.

The access multiplexer DSLAM separates telephony and data services and routes the telephony services for example over a conventional switching center TDM-Vst (TDM=time division multiplex) into the public telephone network PSTN (PSTN=public switched telephony network). According to the invention, the data services are routed by way of an Ethernet network ETH to an access server B-RAS (B-RAS=broadband remote access server) and thence onto the Internet INT.

For the purposes of data exchange between the access server B-RAS and one of the data terminal devices D1, D2, D3 the PPPoE protocol (PPPoE=Point-to-Point Protocol over Ethernet) is used which transports PPP data (PPP=Point-to-Point Protocol), which in turn conveys IP data (IP=Internet Protocol).

The PPPoE data is transferred between data terminal device D and modem M using Ethernet in the majority of cases. Other transfer methods between data terminal device D and modem M are for example ATM or the USB protocol (USB=Universal Serial Bus). The transfer between modem M and access multiplexer DSLAM takes place by means of ATM.

Since according to the invention the onward transportation does not take place—as has previously been customary—using ATM but by way of Ethernet, the PPPoE data is recovered in the access multiplexer and encapsulated in Ethernet frames for transfer over the Ethernet network ETH, in other words the already existing Ethernet header is supplemented with a checksum and an initial identifier.

For this purpose the access multiplexer DSLAM has an Ethernet bridge EB which has filtering facilities to afford protection against denial-of-service attacks and unauthorized access. If the subscriber-side termination of the connection is implemented cost-effectively using Ethernet, there is a danger that as a result of the self-configuration capabilities of the Ethernet bridge EB an attack on the DSLAM using a large number of falsified MAC addresses will cause the routing tables of the DSLAM to overflow. In addition, in the case of unfiltered Ethernet traffic, unauthorized connections between the data terminal devices D1, D2, D3 are possible, for example. In this situation, the following filter rules are applied:

Ethernet frames are routed to the Ethernet bridge (EB) if the PPPoE header can be assigned to an existing connection confirmed by the access server (B-RAS), or if the PPPoE header can be assigned to connection which is set up, whereby a timer is started when the connection is set up and when the timer times out the MAC address of the sending Ethernet component is removed from the routing tables of the Ethernet bridge (EB) provided that no confirmation of the connection set-up is given by the access server (B-RAS) before the timer times out, and all other Ethernet frames which contain a PPPoE header are discarded, and all Ethernet frames which do not contain a PPPoE header are discarded.

As a result of this filtering, the aforementioned attacks or unauthorized access attempts are effectively suppressed.

As a result of the different transfer rates of the subscriber-side interfaces DSL1, DSL2, DSL3 (currently a maximum 8 MBit/s, normally for example 1.5 MBit/s or 768 kBit/s or 512 kBit/s) and of the network-side Ethernet interface or Ethernet interfaces (currently a maximum 1 GBit/s, normally for example 100 MBit/s) of the access multiplexer DSLAM, situations can arise in the transfer direction toward the data terminal device D of a subscriber in which data is delivered over the Ethernet interface(s) at the maximum transfer rate (for example 100 MBit/s) for a single digital subscriber line DSL, over which the onward transportation of the data is only possible at a considerably lower transfer rate (for example 768 kBit/s). As a result of the transfer method based on ATM, on the digital subscriber line DSL this can result in the user data traffic between access multiplexer DSLAM and data terminal device D coming to a complete standstill in spite of a transfer path operating under full load between access multiplexer DSLAM and modem M.

This is caused by the fact that data in the form of Ethernet frames or PPPoE frames is delivered from a receive buffer of the Ethernet interface(s) of the DSLAM at a high data rate, or transfer rate, to a send buffer of the ATM interface of the digital subscriber line DSL. Since Ethernet frames or PPPoE frames are typically considerably larger than ATM cells, a distribution of the frames over a plurality of ATM cells, each capable of conveying 48 bytes of used data, is required. This operation is known as segmentation. As a result of discard strategies in the send buffer of the ATM interface, the situation can now occur in which one or more of these ATM cells are discarded from each frame to be transferred, which results in the frames being transferred incompletely, discarded at the destination and begin requested again.

In order to avoid a blocking of this type, in an advantageous development of the invention a mechanism is provided which uses a Random Early Discard (RED) strategy that is actually applied in the receive buffer of the Ethernet interface to reliably avoid overload situations before they actually arise. Discard strategies other than RED can likewise be applied, for example a discard based on frame size or priority information.

In order to control the discard of frames in the receive buffer of the Ethernet interface, the status of the send buffers of the ATM interfaces of the digital subscriber lines DSL1, DSL2, DSL3 is monitored by means of an appropriate logic circuit. As soon as this determines that the number of frames incoming per unit time by way of the receive buffer exceeds the number of frames outbound from there per unit time by a value to be specified according to the buffer sizes for one of the send buffers of the ATM interfaces, Ethernet frames which are to be conveyed to that particular send buffer will be discarded from the receive buffer of the Ethernet interface. To this end, it is necessary for a determination to actually be carried out in the receive buffer of the Ethernet interface as to where incoming frames are to be conveyed to, in other words an initial evaluation of the destination address should already be performed before the actual routing of a frame.

If the number of frames outbound from the send buffer per unit time lies, for example as a result of major transfer disruptions on the digital subscriber line, below an initial threshold value which is to be defined, all incoming frames for this send buffer will be discarded. If the number of frames outbound from the send buffer per unit time lies above the first but below a second threshold value which is to be defined, frames are discarded according to the selected discard strategy either randomly or in accordance with criteria which are to be defined. Priority information relating to the conveyed frames or the frame length, for example, can be considered as possible criteria. Further threshold values can be defined in order to enable a sufficiently fine level of adjustment of the discard strategy, for example in order to support a greater number of priority values. In the simplest case, the second threshold value actually corresponds to the maximum data rate of the digital subscriber line DSL, in other words if the number of incoming frames per unit time for a special digital subscriber line DSL in the DSLAM is greater than the number of frames outbound with the maximum data rate of the digital subscriber line DSL, frames will be discarded in accordance with the selected discard strategy.

The discard of Ethernet frames is non-critical for the transfer of data insofar as higher protocol layers, for example the Transmission Control Protocol TCP, monitor the transfer and initiate the renewed transfer of lost information.

According to a development of the invention, frames which are used for connection control purposes are not discarded.

Although the invention has been described with reference to a DSL access multiplexer DSLAM, the method according to the invention and the access multiplexer according to the invention can also be applied to other methods for quick access to data networks in which the access multiplexer is linked to downstream components by means of a cost-effective Ethernet network.

The invention claimed is:

1. A method for quick access to a data network, in which data terminal devices of subscribers are each connected by a modem to an access multiplexer each by way of a digital subscriber line, the method comprising:
  using the Point-to-Point Protocol over Ethernet (PPPoE) for a data transfer between the data terminal devices and an access server which is located downstream of the access multiplexer;
  checking the access authorization of the data terminal devices and establishing the access to the data network by the access server;
  establishing a link from the access multiplexer to the access server and to further components located downstream of the access server using an Ethernet network;
  assigning an Ethernet bridge to the access multiplexer or integrating an Ethernet bridge into the access multiplexer;
  evaluating an PPPoE header contained in a received Ethernet frame by the Ethernet bridge, the Ethernet bridge equipped with a filtering mechanism for evaluating;
  forwarding the Ethernet frame to the Ethernet bridge if the PPPoE header can be assigned to an existing connection confirmed by the access server, or if the PPPoE header can be assigned to a connection which is being set up;
  discarding all other Ethernet frames which contain a PPPoE header; and
  discarding all Ethernet frames which do not contain a PPPoE header.

2. The method according to claim 1, further comprising:
  starting a timer when the connection is being set up, wherein,
  when the timer times out, a media access control (MAC) address of a sending Ethernet component is removed from a routing table of the Ethernet bridge if the connection set-up is not confirmed by the access server before the timer times out.

3. The method according to claim 2, wherein the Ethernet frames are discarded randomly or specifically selected for the data transfer direction toward the data terminal device in a receive buffer of an Ethernet interface through which the access multiplexer is connected to the Ethernet network, on the basis of the load status of send buffers which are assigned to the digital subscriber lines.

4. The method according to claim 3, wherein Ethernet frames to be assigned to the respective digital subscriber line are discarded if a send buffer overload condition on the digital subscriber line is predicted by a control logic circuit.

5. The method according to claim 4, wherein connection control frames which can be-recognized on the basis of their Ethernet header are not discarded.

6. The method according to claim 3, wherein connection control frames which can be recognized on the basis of their Ethernet header are not discarded.

7. The method according to claim 1, wherein the Ethernet frames are discarded randomly or specifically selected for the data transfer direction toward the data terminal device in a receive buffer of an Ethernet interface through which the access multiplexer is connected to the Ethernet network, on the basis of the load status of send buffers which are assigned to the digital subscriber lines.

8. The method according to claim 7, wherein Ethernet frames to be assigned to the respective digital subscriber line are discarded if a send buffer overload condition on the digital subscriber line is predicted by a control logic circuit.

9. The method according to claim 8, wherein connection control frames which can be recognized on the basis of their Ethernet header are not discarded.

10. The method according to claim 7, wherein connection control frames which can be recognized on the basis of their Ethernet header are not discarded.

11. The method according to claim 1, wherein the data network is the Internet.

12. An access multiplexer for quick access to a data network, to which data terminal devices of subscribers are each connected by a modem using a digital subscriber line, wherein for the purposes of data transfer between the data terminal devices and an access server located downstream of the access multiplexer the Point-to-Point Protocol over Ethernet PPPoE is used, wherein
the access server checks the access authorization of the data terminal devices and establishes the access to the data network, and wherein
the access multiplexer is connected to the access server and to further components located downstream by an Ethernet network, the access multiplexer comprises:
an Ethernet bridge having filtering facilities for evaluating the PPPoE headers contained in received Ethernet frames, wherein
the Ethernet frames are routed to the Ethernet bridge if the PPPoE header can be assigned to an existing connection confirmed by the access server, or if the PPPoE header can be assigned to a link connection, wherein
all other Ethernet frames which contain a PPPoE header are discarded, and wherein all Ethernet frames which do not have a PPPoE header are discarded.

13. The access multiplexer according to claim 12, further comprising a timer which is started when the connection is set up and when the timer expires a media access control (MAC) address of the sending Ethernet component is removed from the routing tables of the Ethernet bridge provided that no confirmation of the connection set-up is given by the access server before the timer expires.

14. The access multiplexer according to claim 13, further comprising a device for overload protection for the data transfer direction toward the data terminal device.

15. The access multiplexer according to claim 14, wherein the mechanism for overload protection comprises:
a device for monitoring a receive buffer of an Ethernet interface through which the access multiplexer is connected to the Ethernet network;
a mechanism for monitoring the load status of send buffers which are assigned to the digital subscriber lines; and
a mechanism for the random or specific selection and discard of Ethernet frames.

16. The access multiplexer according to claim 12, further comprising a device for overload protection for the data transfer direction toward the data terminal device.

17. The access multiplexer according to claim 16, wherein the mechanism for overload protection comprises:
a device for monitoring a receive buffer of an Ethernet interface through which the access multiplexer is connected to the Ethernet network;
a mechanism for monitoring the load status of send buffers which are assigned to the digital subscriber lines; and
a mechanism for the random or specific selection and discard of Ethernet frames.

18. The access multiplexer according to claim 17, further comprising a control logic circuit for predicting an overload condition for the send buffer of the digital subscriber line and for influencing the receive buffer in order to discard Ethernet frames which are to be assigned to the respective digital subscriber line.

19. The access multiplexer according to claim 16, further comprising a control logic circuit for predicting an overload condition for the send buffer of the digital subscriber line and for influencing the receive buffer in order to discard Ethernet frames which are to be assigned to the respective digital subscriber line.

20. The access multiplexer according to claim 19, wherein the control logic circuit comprises a mechanism for identifying connection control frames on the basis of their Ethernet header and a mechanism for impacting the receive buffer such that connection control frames are not discarded.

* * * * *